RECORD CHANGER PHONOGRAPH

Filed July 26, 1946 5 Sheets-Sheet 1

INVENTOR
Berne N. Fisher
BY James and Franklin
ATTORNEYS.

INVENTOR
Berne N. Fisher
BY James and Franklin
ATTORNEYS

RECORD CHANGER PHONOGRAPH

Filed July 26, 1946 5 Sheets-Sheet 3

INVENTOR
Berne N. Fisher
BY James and Franklin
ATTORNEYS

RECORD CHANGER PHONOGRAPH

Filed July 26, 1946 5 Sheets-Sheet 4

INVENTOR
Berne N. Fisher
BY James and Franklin
ATTORNEYS.

INVENTOR
Berne N. Fisher
BY James and Franklin
ATTORNEYS.

Patented Oct. 7, 1952

2,613,081

UNITED STATES PATENT OFFICE 2,613,081

RECORD CHANGER PHONOGRAPH

Berne N. Fisher, New York, N. Y., assignor to General Instrument Corporation, Elizabeth, N. J., a corporation of New Jersey Application July 26, 1946, Serial No. 686,313

4 Claims. (Cl. 274—10)

This invention relates to a record changer phonograph and more particularly to a novel and simplified method of moving the tone arm of such a phonograph through its record changing and record playing positions and then depositing said tone arm at a selected initial playing position.

In record changer phonographs of this character, mechanism automatically actuatable when the playing of one record is completed is customarily provided for carrying out the following sequence of operations: Lifting the reproducer or tone arm from the played record; shifting the tone arm to clear the turntable so that a record from a pile of records stacked above it may be fed thereto (this position of the tone arm will be herein referred to as the "record changing position"); feeding a new record from the record stack onto the played record (or onto the turntable where no record has as yet been played); returning the tone arm to a starting position over the new record (this position of the tone arm will herein be referred to as the "initial playing position"); and lowering the tone arm onto or adjacent the starting groove of the new record.

Records commercially used in practice are of different sizes or diameters and those most commonly employed are of 10 inch and 12 inch diameter. Mechanism for automatically effecting a record change is usually so designed and constructed that the phonograph may be used for both 10 inch and 12 inch records.

This operation and these requirements impose certain limitations in the design of such a record changer phonograph, with the result that the apparatus employed has in the past been comparatively complicated and composed of numerous parts mechanically interrelated in complex fashion.

It is a prime object of the present invention to provide a record changer phonograph of this character embodying, in addition to new and improved operating features and characteristics, an overall simplified construction so that a generally low cost machine is obtained which may be efficiently operated, easily repaired and readily maintained.

The principal improvements over prior record changers of this type which inhere in the present invention are the following:

1. A single cam carries a three-dimensional cam surface which operates to control the tone arm throughout the sequence of operations above described. This single cam surface both lifts the tone arm to disengage it from the record with which it has been in contact, moves the tone arm to a record changing position, and then, after a new record has been fed to the turntable, moves the tone arm to its initial playing position.

2. The cam is provided with a plurality of paths so that the tone arm may be deposited in any one of a plurality of initial playing positions depending upon the size of record to be played.

3. The means for controlling the choice of paths to be effective upon the tone arm is extremely simplified in comparison with all prior art structures and is characterized in particular by an almost complete lack of moving parts and complicated linkages, yet at the same time achieving its objectives in a positive manner.

4. In one embodiment of my invention, the choice of initial playing positions for the tone arm is automatically effected by the positioning of a record holder, the latter being so designed as to support in its various positions records of different sizes. It is to be borne in mind, however, that it is not essential that the choice be effected by the record holder, since any of the other means well-known in this art may be used for this purpose, such as a trip member which is actuated by the size of the record which drops to the turntable.

5. In the accomplishment of the above objectives, the cam employs centrifugal force to direct the tone arm to that one of its initial playing positions which is radially outwardly disposed from the others, and force exerted upon the tone arm in opposition to said centrifugal force is employed to effect the selection of a different initial playing position. Throughout this specification that initial playing position which is radially outwardly disposed with respect to the others and which therefore corresponds to a record of the largest size will be termed the "normal" initial playing position.

6. In order to further the simplicity of construction which results from the here-described construction, which simplicity is exceedingly important in achieving relatively fool-proof operation coincidentally with inexpensiveness of manufacture, there is provided on the same cam which controls the motion of the tone arm a means which controls the operation of the feeding mechanism, thus employing a single cam for the control of the entire record changing sequence.

7. The tone arm is also connected to the cam in a rigid manner, save only that there is between them an adjustable connection which will permit a change in angular relationship between the tone arm and the cam, thus permitting adjustment of the mechanism to minor variations in record size.

To the accomplishment of the foregoing objects and such other objects as may hereinafter appear, the present invention resides in the phonograph combinations and subcombinations as sought to be defined in the appended claims and as described in the following specification taken together with the accompanying drawings, in which:

*General organization of the machine*

Figures 1, 2:
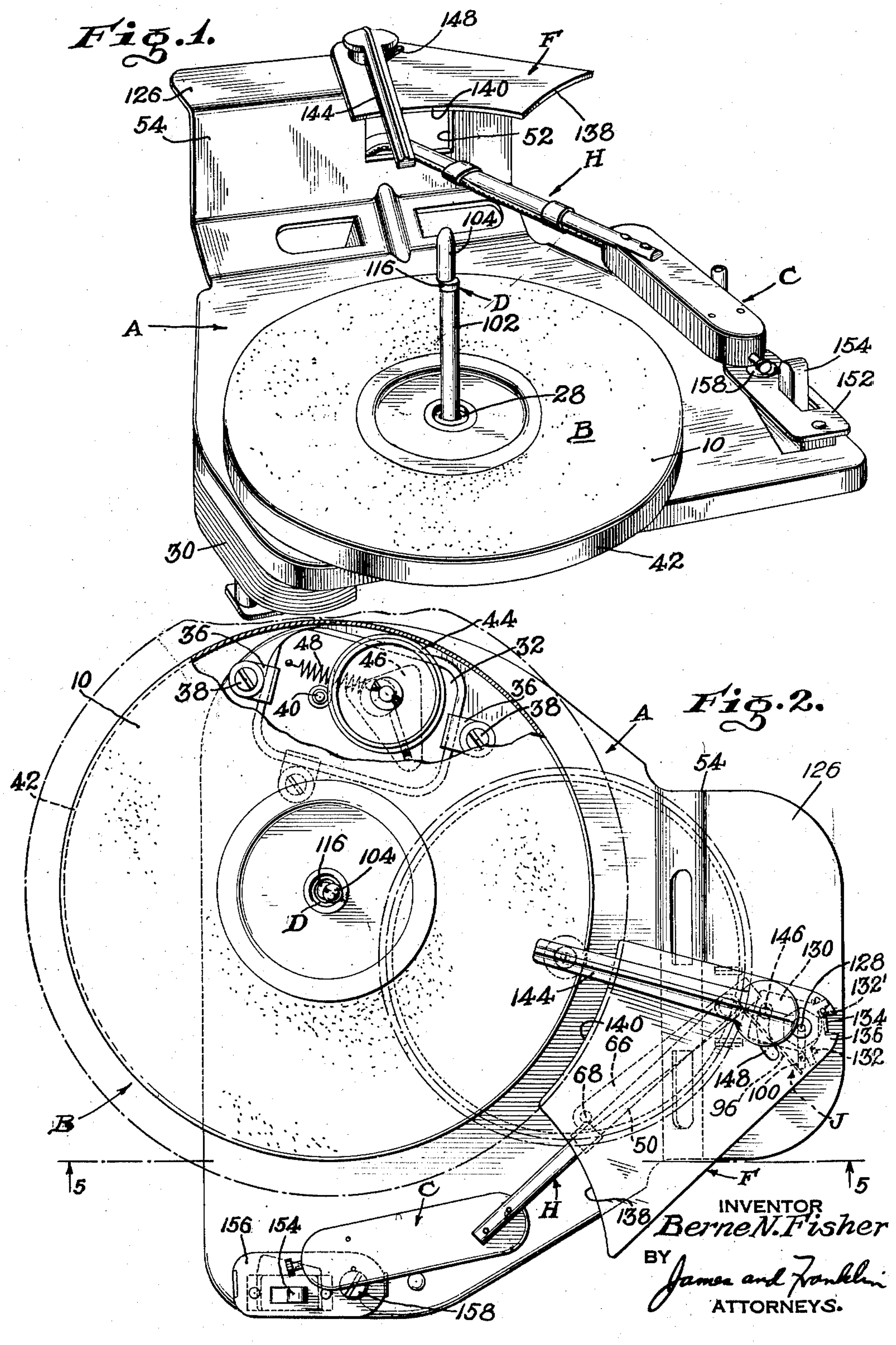
Fig. 1 is a front perspective view of an embodiment of the phonograph of the present invention.
Fig. 2 is a top view thereof with part of the base plate broken away to reveal the turntable driving mechanism.
Figure 5:
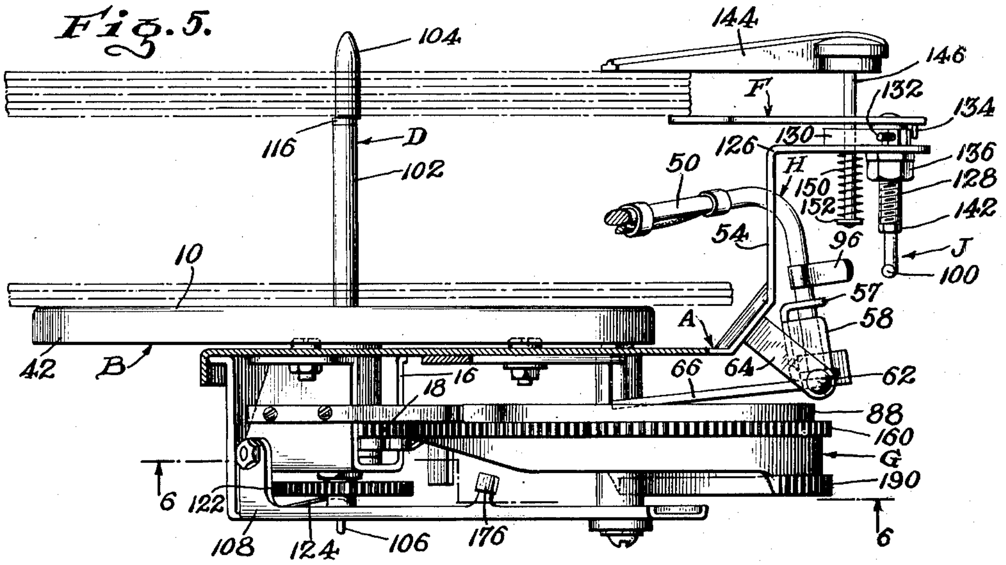
Fig. 5 is a side view, partially in cross-section, taken along the line 5—5 of Fig. 2.

Referring now more in detail to the drawings, and having reference particularly to Figs. 1 and 2 thereof, the phonograph in its general organization comprises a base or supporting plate A which supports all of the parts of the machine, a record turntable B rotatably mounted thereon, a reproducer or tone arm C mounted thereon so as to be movable through record changing and record playing positions, a record supporting and feeding means D centrally arranged with respect to the turntable B but non-rotatable therewith, a record holder F adapted to support by a portion of its periphery the lowest record of a pile of records vertically disposed above the turntable B, a cam G (see Fig. 5) which is provided with a three-dimensional cam surface, a tone arm operating member H connected to the tone arm C at one end and provided at its other end with a cam follower which engages the three-dimensional cam surface of the cam G, control means J independent of the cam G and active upon the tone arm operating member H to control the selection of the initial playing position to which the cam G directs the tone arm C, the record feeding means D being suitably actuated by the cam G to control the dropping of records from the pile of records vertically disposed above the record holder F to the turntable B, all of these elements cooperating with one another and with the remainder of the record changer mechanism to achieve the above-described objectives and sequence of operations.

It is of the essence of the construction herein described that the single cam G control the entire sequence of motions of the tone arm C during the record changing operation, that the cam G be so constructed as to place the tone arm C in any one of a plurality of initial playing positions, that the tone arm C be positioned in its normal initial playing position, that is to say, one which is outwardly radially disposed with respect to the others and which corresponds to a record of large size, solely by the action of centrifugal force, that the tone arm C be positioned in a non-normal initial playing position, corresponding to a record of smaller size, by the application of a force thereto in opposition to the aforementioned centrifugal force, and that the same cam G also control the operation of the record feeding means D so that proper timing thereof is positively assured in a simple manner.

As here illustrated, the force in opposition to centrifugal force which operates to position the tone arm C in a non-normal initial playing position is effected by the control means J which is attached to and operated by the record holder F. If records of large size are to be played, the record holder F must be so positioned as to support such records and the control means J is simultaneously positioned so as to permit centrifugal force to deposit the tone arm in its normal initial playing position corresponding to the large record. If smaller records are to be played, the record holder F must be moved to a position to support them and the control means J is then simultaneously moved to a position whereby it exerts a force upon the tone arm C in opposition to the centrifugal force imparted thereto by the cam G and consequently the tone arm C is positioned in a non-normal initial playing position inwardly radially disposed from the normal initial playing position and corresponding to a record of smaller size as supported by the record holder F.

The turntable B may comprise an inverted dished disc member 10 with a suitable frictional material on its upper surface so as to engage and rotate records which may be placed thereupon and provided with a depending hub 12 (see Figs. 3 and 8) the lower edge of which is adapted to rest upon and be supported by a ball bearing race 14 which in turn is supported by bracket 16 attached to the base plate A. At the lower end of the hub 12 are provided a gear 18, which is preferably formed of pressed fibre material, below which is mounted a mutilated gear 20 having but a small number of relatively widely separated individual gear teeth 22 (see Figs 3, 4 and 6).

The hub 12 is hollow and fits over and is rotatable around a spindle sleeve 24 which is fixed to the bracket 16 by means of nut 26 engageable with the threaded lower end 27 of said sleeve. The interior of the hub may be provided with hollow cylindrical bearing inserts 28, 28' to provide for alignment and free rotation of the turntable B.

Figures 3, 4:
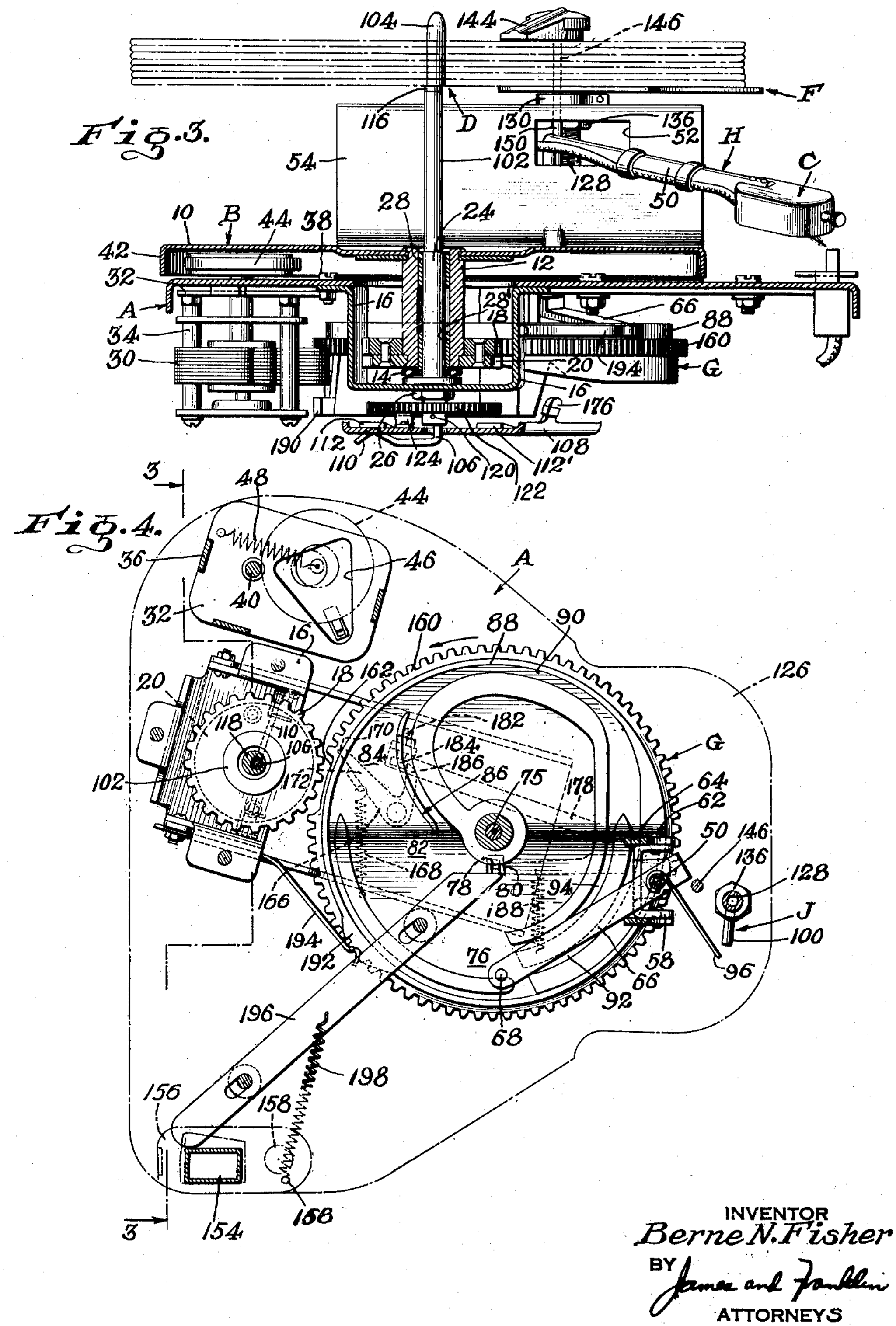
Fig. 3 is a cross-sectional view taken along the line 3—3 of Fig. 4.
Fig. 4 is a top view of that portion of the phonograph mounted below the base plate, with the base plate indicated in broken lines.

Rotation of the turntable B is effected by an electric motor 30 mounted on bracket 32 by means of screws 34, the bracket in turn being mounted upon the base plate A by means of lips 36 and screws 38 (see Figs. 2 and 3). The drive shaft 40 of the motor 30 projects upwardly through the bracket 32 and the base plate A to a position within the depending flange 42 of the turntable B where it frictionally contacts the periphery of a rubber-faced wheel 44 which is rotatably mounted on plate 46 which is in turn slidable over the bracket 32 and is constantly and resiliently urged, by means of spring 48, into a position such that the rubber-faced wheel 44 is simultaneously brought into frictional contact with the drive shaft 40 of the motor 30 and the interior of the depending flange 42 of the turntable 10. Upon energization of the motor, causing it to rotate, the turntable is thus rim-rotated, and the gears 18 and 20 at the bottom of the turntable hub 12 are simultaneously rotated.

*Tone arm and moving means therefor*

The reproducer or tone arm C is rigidly attached to the tone arm operating member H in any suitable manner. As here illustrated, that part of the operating member H which is connected to the tone arm C is illustrated as a metal tube 50, preferably made of aluminum for lightness, which extends through an aperture 52 in a rear vertical extension 54 of the base plate A and which is then bent downward so as to pass loosely through aperture 56 in lip 57 of bracket 58, through a similar aperture (not shown) in the lip 60 of said bracket and to extend therebelow so as to be rotatable with respect to the bracket 58 within said apertures.

The bracket 58 is in turn tiltable about pintles 62 supported by arms 64 attached to the base plate A. A bar 66 is provided at one end with a cam follower 68 and its other end passes below the lip 60 of the bracket 58 and is then bent upward and backward so as to envelop that lip. An orifice 70 is provided in the reversely bent tip 72 of the bar 66 and through the orifice 70 passes a portion of the vertical part of the bar 50. A set screw 74 is provided to adjustably fix the position of the tone arm C with respect to the cam follower 68 and at the same time to permit a change in angular relationship between said two elements in order to ensure proper positioning of the tone arm in its initial playing positions on the records employed.

The rigid construction of the tone arm operating member H, comprising the tube 50, bracket 58 and bar 66, ensures positive positioning of the tone arm at all times through the action of the cam G upon the cam follower 68.

The cam G is mounted so as to be rotatable about stud 75 attached to the base plate A by bolt 77. As here illustrated, its upper face is provided with a three-dimensional surface upon which the cam follower 68 rides, the details of which may best be understood by a study of Figs. 4, 11, 12 and 13. It has a substantially radial depressed portion 76 over which the cam follower 68 rides as the tone arm C engages with the playing groove in the record and moves radially inwardly guided thereby. The depth of the depressed portion 76 is preferably so great that when the tone arm C is in contact with a record on the turntable B, the cam follower 68 will be raised slightly above the cam surface so that no frictional resistance is offered to the tone arm C as it conforms to the playing groove of the record. The cam follower 68 is illustrated in this portion 76 of the cam surface in Figs. 4 and 9.

When the tone arm has traveled to the end of the playing groove on the record, the arm 66 and cam follower 68 will have been moved to a position inwardly radially disposed with respect to the cam and they will there contact and press inwardly a trip arm 78 which extends upwardly through an aperture 80 in the cam G, thereby initiating the rotation of the cam G in a manner hereinafter to be described, which rotation controls and actuates the entire record changing sequence.

The first effect of the initiation of the record changing sequence will be to cause the cam G to rotate in the direction indicated by the arrows of Figs. 4, 6, 11, 12 and 13. The cam follower 68 will at that time contact the cam surface area designated 82, which surface is three-dimensionally shaped so as to incline upwardly and outwardly so that the cam follower 68 is simultaneously lifted and, by the inclination of the surface 82 in conjunction with centrifugal force, urged outwardly toward the periphery of the cam G. Because of the rigid connection between the cam follower 68 and the tone arm C, the tone arm is thus lifted and disengaged from the record and urged toward a radially outward position.

As rotation of the cam G continues, the cam follower 68 comes into contact with the surface 84, which surface is flat and at an elevation such that the tone arm will be raised above the height of the maximum number of records receivable on the turntable B. Raised guide portion 86 in conjunction with the raised peripheral rim 88 which surrounds the entire cam surface ensures that the cam follower 68 is urged to its most outward position so that it enters path 90, the position of the tone arm C being so regulated with respect thereto, by means of set screw 74, that the tone arm C will then be in its record changing position, so far outwardly radially disposed with respect to the turntable B that it will not interfere with the dropping of records thereonto.

As here illustrated, the cam G is then provided with a pair of paths 92 and 94, the former being outwardly radially disposed with respect to the latter, both communicating at one end with the path 90 leading inwardly a proper amount with respect to the path 90 and both being downwardly inclined and opening at their other end into the aforementioned depressed portion 76. As the cam follower 68 is caused to traverse the outer path 92, the tone arm C will be deposited in its normal initial playing position, the initial playing position outwardly disposed with respect to the other possible initial playing positions and corresponding to the largest sized record playable upon the machine (see Fig. 4). The rotation of the cam G proceeds at such a speed that the centrifugal force active upon the cam follower 68 as it passes through the path 92 is sufficient to cause the cam follower 68 constantly to bear against the outer retaining rim 88 of the cam G and thus it will pass into the path 92 without the necessity of any action other than the rotation of the cam G.

Figures 11, 12, 13, 14, 15:
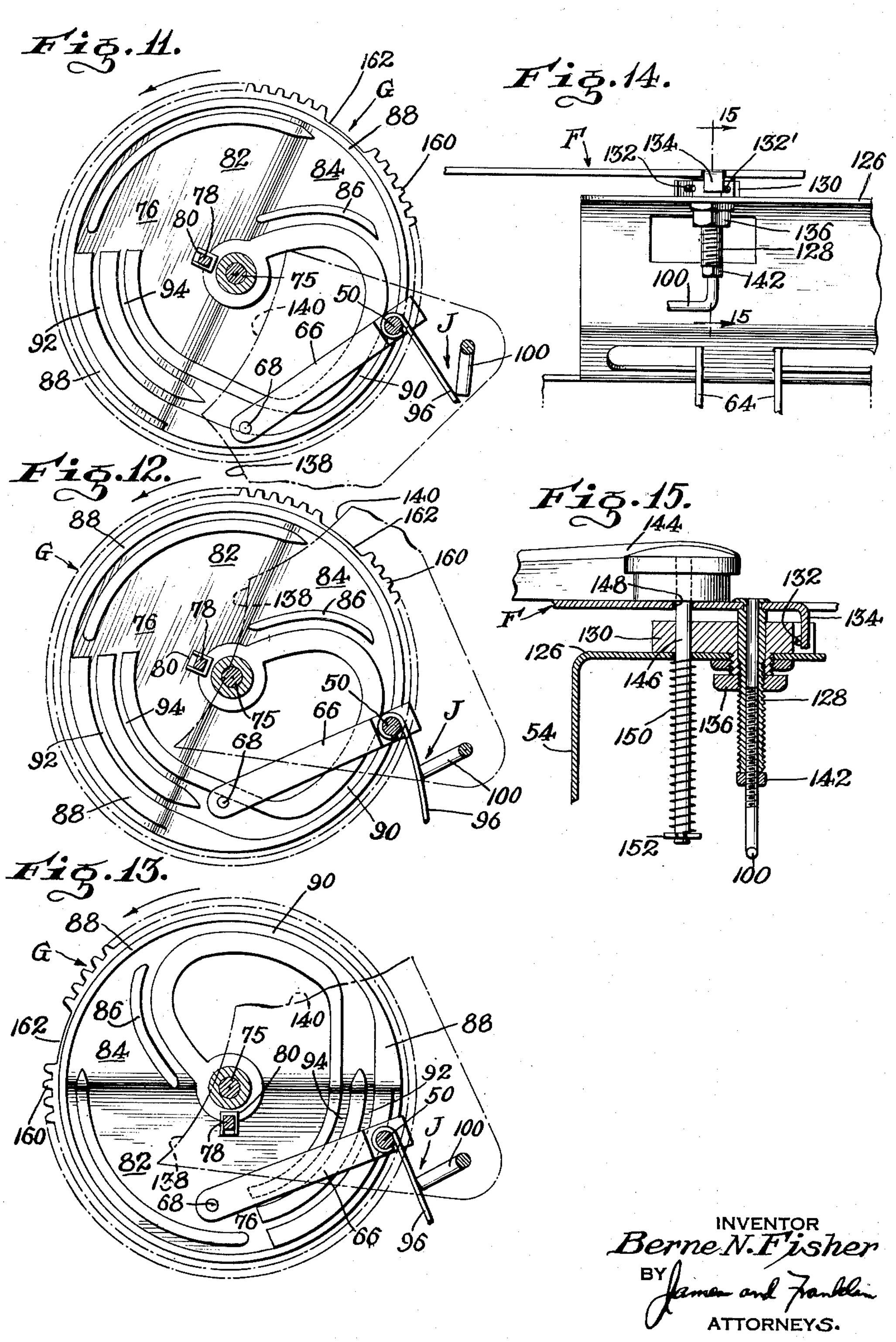
Fig. 11 is a schematic view of the three-dimensional cam in operation as it directs the tone arm to its normal initial playing position.
Fig. 12 is a view similar to Fig. 11 except that the tone arm is being directed to a non-normal initial playing position.
Fig. 13 is a view illustrating a rotation of the cam approximately 60° counterclockwise from the position shown in Fig. 12.
Fig. 14 is a rear detail view of the record holder, its means of support, and the control means attached thereto.
Fig. 15 is a cross-sectional view taken along the line 15—15 of Fig. 14 and showing in addition the pressure finger active upon the top of the record pile.

If the cam follower 68, on the other hand, be caused to enter and traverse the path 94, the tone arm C will be deposited in a non-normal initial playing position, one inwardly radially disposed with respect to the normal initial playing position and corresponding to a record of a size smaller than maximum (see Fig. 13). In order to ensure passage of the cam follower 68 through the path 94 when desired, I have devised an extremely simple system, embodying the control means J, which eliminates the employment of the complicated apparatus and linkages of prior art structures. As here illustrated, I attach to the vertical portion of the bar 50 a spring leaf tab 96, here shown as attached by means of screw 98. It is to be understood, however, that any projection from the tone arm operating member H would serve the same purpose, whether that projection be resilient or rigid and whether it be connected to the operating member H in the position here shown or in some other position. I further provide, to cooperate with the spring leaf tab 96, a control arm 100 which as here illustrated is capable of assuming the inoperative position shown in Figs. 4, 5 and 11 and the operative position shown in Figs. 12 and 13. When the control arm is in its position shown in Fig. 11, it will not contact the spring leaf 96 during any portion of the record changing sequence and consequently, as hereinbefore described, centrifugal force will ensure that the cam follower 68 will traverse the path 92. Consequently, the position of the control arm 100 illustrated in Fig. 11 is the position in which it should be placed when the normal initial playing position of the tone arm C is desired.

When the control arm 100 is placed in its operative position as shown in Figs. 12 and 13, it will, during the time that the cam follower 68 is in the path 90, contact the spring leaf 96 and flex the latter, thereby exerting a torsional force upon the vertical portion of the tube 50 in such a direction as to urge the cam follower 68 inwardly against the action of the centrifugal force imparted thereto by the rotation of the cam G. The control arm 100 and the spring leaf 96 are so formed that this effect will continue until sometime after the cam follower 68 has entered the path 94 (see Fig. 12). Consequently, the position of the control arm 100 illustrated in Figs. 12 and 13 is that in which it should be placed when a non-normal initial playing position is desired for the tone arm C.

*Record changing and dropping mechanism*

Within the spindle sleeve 24 is fixedly mounted the hollow spindle 102. A spindle cap 104 is fixed to a shaft 106 which is eccentrically mounted within the spindle 102 and which extends through an aperture in a bracket 108 fixed below the bracket 16 and which is then resiliently bent into an inverted hook shape as at 110 (see Fig. 3), which hook cooperates with recesses 112, 112' in the bracket 108 to ensure positioning of the spindle cap 104 either concentric with the spindle 102 for removing a played stack of records from the turntable B (see broken lines of Fig. 8) or in position eccentric with respect thereto representing a rotation of the shaft 106 through 180° (see solid lines of Fig. 8), in which position the cap 104 receives the stack of records illustrated in Figs. 3 and 5, the bottom-most record resting upon the button 116.

Figures 8, 9, 10:
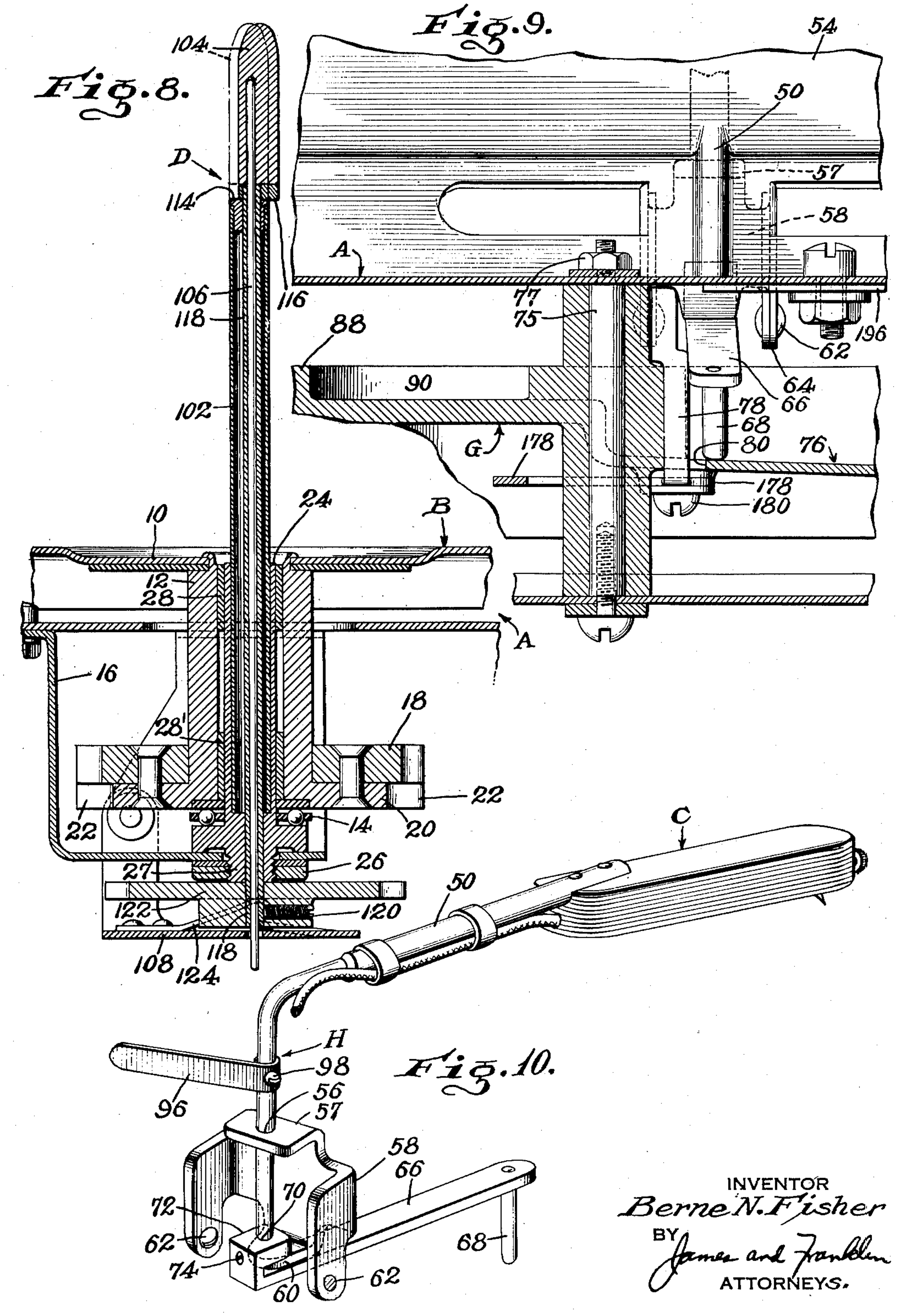
Fig. 8 is a cross-sectional view on an enlarged scale of the spindle, record feeding means, and turntable mounting means.
Fig. 9 is a cross-sectional view of the cam and cam follower, taken along the line 9—9 of Fig. 6, showing the cam follower in a position corresponding to the completion of playing of a record.
Fig. 10 is a perspective schematic view of the tone arm, its operating member, and its method of mounting.

The record feeding means is of a type known in the art and is associated with the central spindle support. This record feeding means comprises the button 116 which is fixed to a sleeve 118, which sleeve surrounds the shaft 106 and is therefore eccentrically mounted in the spindle 102. To the lower end of the sleeve 118 is fixed, by means of set screw 120, hubbed gear 122 so that its rotation will be imparted to the button 116. When this rotation takes place, the button 116 is moved from its normal position concentric with the spindle 102 to a position concentric with the spindle cap 104 (as shown in Fig. 8), whereupon the stack of records, the central holes of which envelop the spindle cap 104, will be permitted to move downwardly, the central hole in the lowermost of said records enveloping the button 116, the lowermost record being supported in position by engaging the top shoulder 114 of the spindle 102. As the button 116 continues to rotate, it moves back to its position concentric with the spindle 102 and thus frees the record which envelops it from the support of the surface 114 of the spindle 102, whereupon the record is permitted to drop to the turntable B, where it rests either upon the turntable B itself or upon the records which have been previously dropped thereupon. The button 116 in this last cycle of its movement also interposes itself as a support for the remaining records in the stack with the result that the remaining records are then supported in normal manner.

In order to ensure positive positioning of the button 116 in its normal position concentric with the spindle 102, the underside of the gear 122 is provided with an appropriately placed depression which is engageable in detent manner by spring 124 attached to the upper surface of bracket 108.

With feeding means of the type described, it has been found desirable to provide additional support for the stack of unplayed records at their periphery. This support is here provided by the record supporting plate F mounted on a horizontal portion 126 of the rear extension 54 of the base plate A so as to be rotatable about the axis of the shaft 128 to which it is rigidly attached. The portion 126 of the base plate A may have a collar 130 fixed thereto through which the shaft 128 rotatably projects, the collar being provided with a pair of adjustable stops, here shown in the form of screws 132, 132' which cooperate with a depending lug 134 from the plate F. The shaft 128 may be secured to the collar 130 by means of bolt 136.

The record supporting edge of the plate F is arcuately cut away as at 138 and 140, the shape of these portions corresponding to the sizes of the records to be played. Thus, when the plate F is in its position shown in Figs. 1 and 2, the surface 140 will support, for example, 12 inch records on the spindle cap 104 but will not support 10 inch records thereon. Furthermore, the area of support is so designed that when records are moved, by means of the button 116, from a position concentric with the spindle cap 104 to a position concentric with the spindle 102, they will be withdrawn from the supoprt of the plate F and consequently will be permitted to drop. If the plate F be moved so that the surface 138 is in position for supporting records, that surface will support 10 inch records in such a manner that they too may drop to the turntable B when moved to a position concentric with the spindle 102 but will present such an area of support to 12 inch records that they will not be droppable. Consequently, the position of the plate F, as determined by the stops 132, 132', will determine the size of record to be played by the record changer.

The control arm 100 is here shown as adjustably threaded within the shaft 128, its position therein being fixed by means of lock nut 142. Since the position of the record supporting plate F determines the size of record to be played by the record changer, since the size of record to be played determines the choice of initial playing position for the tone arm C, and since the position of the control arm 100 controls the choice of initial playing position at which the cam G deposits the tone arm C, it is consequently extremely advantageous to connect the control arm 100 to the record supporting plate F so that choice of proper initial playing position for the tone arm C is automatically effectuated by the positioning of the plate F.

In order to provide additional stability to the stack of records supported by the plate F, a pressure finger 144 may be employed which is here shown as attached to shaft 146 which extends down through an arcuate slot 148 in the plate F, through the collar 130 and through the portion 126 of the base plate A, where a helical spring 150 enveloping the shaft 146 and compressed between the bracket 126 and a washer 152 at the bottom of the shaft 146 constantly tends to pull the pressure finger 144 down and thus applies pressure upon the record stack.

*The mechanism for producing a record changing cycle*

An electrical switch 154 mounted in bracket 156 which is so attached to the base plate A as to be pivotable about screw 158 controls the operation of the motor 30. As has previously been described, as the motor 30 rotates, the turntable 10 is driven and consequently the gears 18 and 20 attached to the bottom of its hub 12 simultaneously rotate. The periphery of the cam G is provided with gear teeth 160 positioned coplanar with the gear 18. The gear teeth 160 extend completely around the periphery of the cam G except for a portion 162 thereof where the gear teeth are mutilated. Within this portion 162 the gear 18 normally rotates in non-engaging manner (see Fig. 6).

Figure 6:
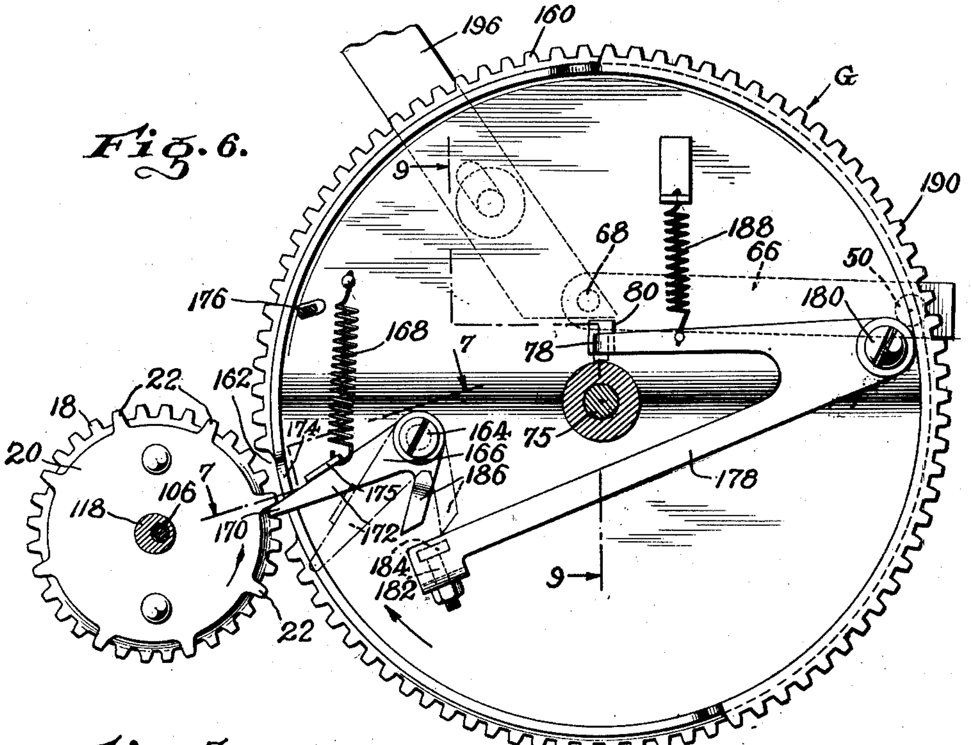
Fig. 6 is a bottom view taken along the line 6—6 of Fig. 5.
Figure 7:
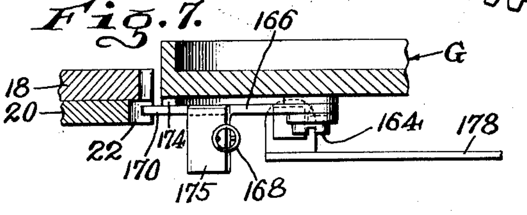
Fig. 7 is a detail cross-sectional view of the cam actuating mechanism taken along the line 7—7 of Fig. 6.

Attached to the underside of the cam G so as to be pivotable about stud 164 is angle piece 166 which is spring urged by means of helical spring 168 to the position shown in solid lines of Fig. 6 in which the tip 170 of the arm 172 thereof protrudes slightly into the space 162. Ledge 174 positively positions the tip 170.

When in that spring urged position, the tip 170 is coplanar with and engageable by any one of the individual separated gear teeth 22 carried by gear 20. As the gear 20 rotates in the direction indicated by the arrow of Fig. 6, the tooth 22′ will engage with the protruding tip 170 and will rotate the cam G in the direction indicated by the arrow thereon so that the gear 18 will mesh with the gear teeth 160 on the cam G and thus ensure a complete rotation thereof.

As the cam G rotates, a depending lug 175 on the arm 172 contacts lug 176 fixed to the bracket 108 and the angle piece 166 is thus caused to pivot in a counterclockwise direction about the stud 164 moving it to the position indicated by the broken lines of Figs. 4 and 6.

Also attached to the underside of the cam G is the latch 178 which is pivotable about stud 180 and is adjustably engageable with one arm of the angle piece 166 by a screw 182 having a wide head 184. When the angle piece 166 is in its retracted position as indicated in the broken lines of Fig. 6, the tip 186 thereof is adapted to be engaged by the head 184 of the screw 182, and since the latch 178 is constantly urged, by means of spring 188, in a direction such as to maintain that engagement, the latch 178 serves to keep the angle member 166 in its retracted position.

As the cam rotates, the interaction of the cam follower 68 with the upper cam surface takes place as has previously been described and completely controls the motion of the tone arm C. In addition, a portion of the cam G is provided with a fragmentary gear 190 positioned coplanar with the gear 122 attached to the button 116. The number of teeth in the fragmentary gear 190 equals the number of teeth in the gear 122 and consequently for each rotation of the cam G a complete rotation is imparted to the gear 122 and the button 116. The proper timing for interrelating the record dropping action with the tone arm moving action is achieved by properly positioning the fragmentary gear 190 on the periphery of the cam G.

After the cam G has made a complete revolution, which corresponds to a complete record changing sequence, it is essential that the cam G should be in a position such that the gear 18 is freely rotatable within the space 162. To this end, a notched projection 192 is applied at an appropriate point to the exterior of the peripheral rail 88 which cooperates with a relatively strong spring hook 194 suitably attached to the record changer framework to detent-load the cam G in its desired stationary position.

When a record has been completely played, the inner end of the bar 66 and the cam follower 68 contact the trip arm 78, as shown in Fig. 9 and as has already been described. The lower end of the trip arm 78 is attached to one arm of the latch 178 and when the trip arm 78 is moved inwardly, the latch 178 is moved to its position shown in solid lines in Fig. 6, at which time the engagement of the arm 186 of the angle member 166 with the head 184 of the screw 182 is broken. Consequently, as has been explained, the spring 168 causes the angle member 166 to rotate so that the tip 170 of its arm 172 protrudes into the space 162 where it is engaged by one of the gear teeth 22. In this manner, the record changing sequence is automatically initiated upon the completion of playing of a record.

Beneath the base plate A is slidably mounted bar 196 which is constantly spring urged by means of spring 198 into contact with the pivotable switch bracket 156. The inner end of the arm 196 stops just short of contacting the trip arm 78 (see Figs. 4 and 6). If it be desired to manually initiate a record changing sequence for any reason, all that is necessary is to manually pivot the switch bracket 156 by, for example, the application of sideward pressure to the switch button 154. This will cause the bar 196 to slide inwardly against the tension of the spring 198 and to move the trip arm 78 inwardly, thus initiating the record changing sequence.

*Conclusion*

It will be apparent from the above description that the record changer of the present invention, adapted as it is for automatic initiation of the record changing sequence upon completion of the playing of a record and also adapted for automatic changing for records of various sizes, when compared to prior structures which achieve the same result, exhibits markedly simplified construction, positive operation, and practically no adjustment points which might lead to operating troubles. Thus, this record changer is not only more dependable in operation than prior devices of the same nature, but is also exceedingly less expensive to manufacture and much simpler to assemble.

Because of the simplicity, lack of complicated linkages, and positive action of this record changer, it has been found that it achieves a complete record changing sequence in an exceedingly short period of time, being limited only by the time necessary to impart a complete rotation to the cam G. This is obviously a matter of choice, being dependent on the gear ratio between gears 18 and 160.

Indeed, the record changing sequence can take place so rapidly that if a record sticks even momentarily on the spindle 102, the tone arm C will be deposited in its initial playing position before the record has had a chance to drop to the turntable B. Accordingly, it has been found desirable in the present state of industrial development of this record changer to artificially slow down the record changing sequence to a period of approximately four seconds. However, the mechanism is capable, provided the records used therewith are carefully chosen, to accomplish a complete record changing sequence in two seconds or less and as the commercial production of records achieves closer conformity to dimensional standards, it will be possible to so design the record changer of the present invention as to materially decrease the effective elapse of time of a record changing sequence.

All of the above-described advantages are achieved by means of the constructional features as herein generally described and as defined in the following claims, but it is apparent that a myriad of detailed changes in design may be resorted to without departing from the scope of my invention.

I claim:

1. In an automatic phonograph, a base plate, a turntable rotatably mounted thereon, a tone arm above said turntable movable through record playing and record changing positions, a cam rotatably mounted below said base plate and having a plurality of paths corresponding to different initial playing positions of said tone arm, a tone arm operating member connected to the tone arm, extending below said base plate, and there being provided with a follower engageable with said cam and movable within the paths on said cam, the cam and cam follower functioning in the operation of the phonograph to move the tone arm to a record changing position and return the same to any one of a plurality of initial playing positions, control means on said tone arm operating member to one side of said base plate, a record holder mounted on and above said base plate and movable between positions for supporting records of large and small sizes, said record holder comprising a rotatable plate connected to a vertical member extending downwardly from said plate, said vertical member having a lateral projection, said tone arm operating member having a finger projecting from a portion thereof, said projection and said finger, by rotation of said plate to support records of one size, being positioned so as to be engageable to cause said cam follower to move in a given cam path so as to select an appropriate initial playing position for said tone arm, rotation of said plate to support records of another size positioning said projection so as to be non-engageable with said finger, thus permitting said cam follower to move in a different cam path so as to select an appropriate initial playing position for said tone arm.

2. The automatic phonograph of claim 1, in which said record holder comprises a rotatable plate connected to a vertical member having a projecting lug, and in which said tone operating member is provided with a vertical portion to one side of said base plate, said vertical portion having a finger projecting therefrom, at least one of said finger and said lug being resilient, rotation of said plate to support records of one size positioning said lug so as to be engageable with said finger to cause said cam follower to move in a given cam path so as to select an appropriate initial playing position for said tone arm, rotation of said plate to support a record of another size positioning said lug so as to be non-engageable with said finger, thus permitting said cam follower to move in a different path so as to select an appropriate initial playing position for said tone arm.

3. The automatic phonograph of claim 2, in which the direction of projection of said projecting lug is adjustable with respect to said plate.

4. In an automatic phonograph, a base plate, a turntable rotatably mounted thereon, a tone arm above said turntable movable through record playing and record changing positions, a cam rotatably mounted below said base plate and having a plurality of cam paths corresponding to different initial positions of said tone arm, a secondary plate extending upwardly from said base plate to one side of said turntable and having an aperture therein, a tone arm operating member connected to said tone arm and extending through said aperture and downwardly behind said secondary plate to a point below said base plate, a cam follower secured to the lower portion of said tone arm operating member and engageable with said cam, said tone arm operating member being pivotally mounted in two senses so as to raise and lower said tone arm from said turntable and swing said tone arm over and beyond said turntable, all as urged by said cam, and a record holder mounted on said secondary plate in position to support the periphery of a stack of records above said turntable, said record holder being movable between positions close to and remote from said turntable for supporting records of different sizes, and operatively connected elements positioned behind said secondary plate and cooperable with said tone arm operating member for causing the cam follower secured thereto to move within a particular cam path, said elements including a member operatively connected to and movable with said record holder and a second member operatively connected to and movable with said tone arm operating member, said members being operatively connected and effective to cause said cam follower to select a cam path corresponding to the size of record which said record holder is positioned to support.

BERNE N. FISHER.

(References on following page)

REFERENCES CITED

The following references are of record in the file of this patent:

UNITED STATES PATENTS

| Number | Name | Date |
|---|---|---|
| 2,031,449 | Arvidius | Feb. 18, 1936 |
| 2,158,328 | Johnson | May 16, 1939 |
| 2,230,106 | Erwood | Jan. 28, 1941 |
| 2,235,693 | Wells | Mar. 18, 1941 |
| 2,307,030 | Erwood | Jan. 5, 1943 |
| 2,328,052 | Butler | Aug. 31, 1943 |
| 2,328,641 | Glaser | Sept. 7, 1943 |
| 2,328,703 | Becwar | Sept. 7, 1943 |
| 2,352,331 | Leline | June 27, 1944 |
| 2,368,086 | Becwar | Jan. 30, 1945 |
| 2,488,137 | Morrison | Nov. 15, 1949 |

FOREIGN PATENTS

| Number | Country | Date |
|---|---|---|
| 399,184 | Great Britain | Sept. 25, 1933 |
| 459,155 | Great Britain | Jan. 4, 1937 |